Sept. 9, 1952          R. H. GODDARD          2,609,658
TARGET TYPE COMBUSTION CHAMBER HAVING A CLOSED END PORTION
RECEIVING CONICAL FUEL AND OXIDIZER SPRAYS
Filed May 11, 1946
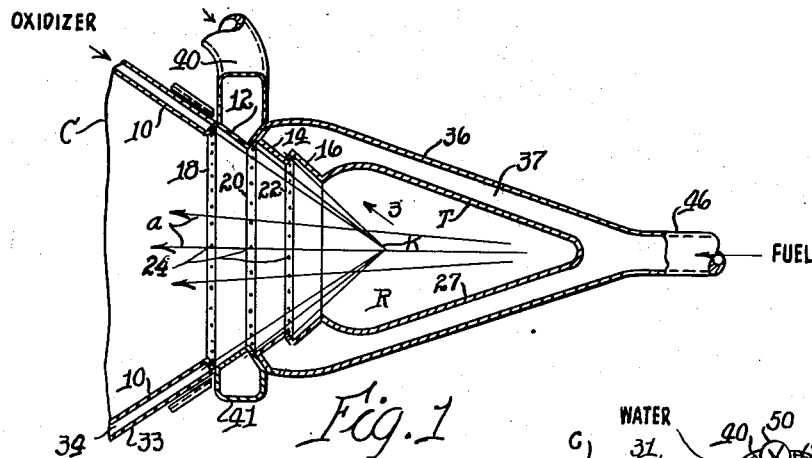
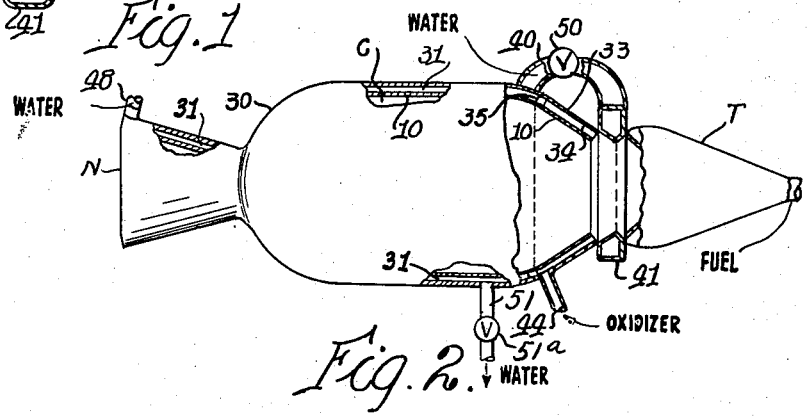
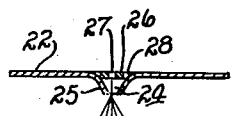
Fig. 5.
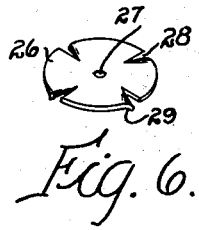
Fig. 6.
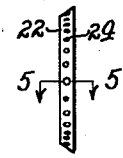
Fig. 4.
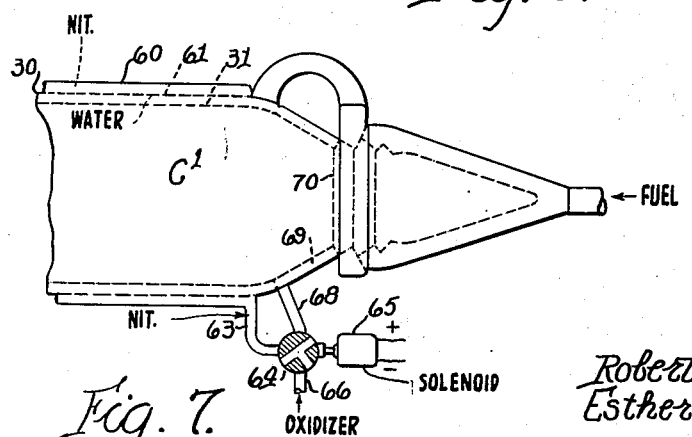
Fig. 3.
Inventor.
Robert H. Goddard, Dec'd.
Esther C. Goddard, Executrix
Chas. T. Hawley
ATTY.

Patented Sept. 9, 1952

2,609,658

UNITED STATES PATENT OFFICE 2,609,658

TARGET TYPE COMBUSTION CHAMBER HAVING A CLOSED END PORTION RECEIVING CONICAL FUEL AND OXIDIZER SPRAYS

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application May 11, 1946, Serial No. 669,055

3 Claims. (Cl. 60—35.6)

This invention relates to a combustion chamber of the type in which sprays of combustion liquids are directed toward the closed or forward end of the chamber, while the combustion gases are discharged through a nozzle at the opposite or rearward end of the chamber. The forward end portion of the chamber forms an axially recessed or target portion of substantial depth which constitutes a mixing and ignition chamber.

It is the general object of this invention to provide improved means for feeding combustion liquids to a target-type combustion chamber.

A further object is to provide improved constructions for jacketing and cooling such a combustion chamber, and for utilizing the heat of the combustion gases to warm the extremely cold liquid oxygen commonly used as an oxidizing element. Improved means is also provided for preventing the clogging of the apparatus, when not in operation, by the condensing and freezing of water in the liquid oxygen feeding device.

The invention further relates to arrangements and combinations of parts which will be hereinafter described and more particularly pointed out in the appended claims.

Preferred forms of the invention are shown in the drawing, in which:

Fig. 1 is a partial sectional side elevation of the improved combustion chamber;

Fig. 2 is a side view of a complete chamber, partly in section;

Fig. 3 is a partial end elevation, looking in the direction of the arrow 3 in Fig. 1;

Fig. 4 is a side elevation of an annular conical spray plate;

Fig. 5 is a detail sectional view, taken along the line 5—5 in Fig. 4;

Fig. 6 is an enlarged perspective view of a perforated disc to be described; and Fig. 7 is a partial side elevation similar to Fig. 2 but showing a modified construction.

Referring to Figs. 1 and 2, a combustion chamber C is shown having a discharge nozzle N and having a target portion T. The chamber C has a side wall 10, the forward portion of which is formed in a series of conical steps 12, 14 and 16 connected by annular conical rings or spray plates 18, 20 and 22. One of these spray plates, as 22, is shown separately in Fig. 4.

Each of the plates is provided with a series of feed openings 24 through which liquids may be sprayed to the recess R enclosed by the casing 27 of the target T. The perforations 24 in adjacent plates are preferably staggered, as shown in Fig. 3.

When liquids under pressure are supplied to the spray plates 18, 20 and 22, sprays are injected to the target recess R and converge at a point K in said recess. The more or less vaporized liquids are thus intimately intermingled in the target recess and, when ignited, the combustion gases are reflected from the target T and pass from the target recess R to the chamber C, where combustion is continued, and to the discharge nozzle N, as indicated by the arrows a in Fig. 1.

A preferred manner of forming the feed openings 24 in the spray plates 18, 20 and 22 is shown in Fig. 5, where the opening 24 is produced by punching the plate 22 outward to produce a conical projection or burr 25 with a hole 24 in the apex. A small metal plate 26 is welded or otherwise secured over each projecting portion 25 and is provided with a small axial hole 27 and with notches 28 each having one curved edge as indicated at 29 (Fig. 6).

A small straight stream of liquid is projected through the aligned holes 27 and 24, and additional and somewhat angularly disposed streams are projected through the notches 28 to the hole 24 and are given a rotary or whirling motion by the curved edges or lips 29. The liquid stream from each feed opening 24 is thus more or less broken up, so that effective intermingling in the target recess R is facilitated.

The chamber C has an outer casing 30 providing a jacket space 31 surrounding the central and exit portion of the chamber and also the discharge nozzle N. The forward or right-hand portion of the chamber (as viewed in the drawings) is provided with an outer casing 33 which coacts with the chamber wall 10 to provide a second jacket space 34. The target portion T has an outer casing 36 coacting with the wall 27 of the recess R to provide a third jacket space 37 (Fig. 1).

A partition 35 separates the jacket spaces 31 and 34, and adjacent the partition 35 the space 31 is connected by a pipe 40 to an annular member or volute 41 which surrounds the conical portion 12 of the combustion chamber wall and also the spray plate 20.

An oxidizing liquid, as liquid oxygen, may be introduced under pressure to the jacket space 34 through a feed pipe 44 (Fig. 2) and is sprayed through feed openings 24 in the conical spray plate 18. Liquid fuel, as gasoline, is fed under pressure through an axially positioned pipe 46 to the jacket space 37 surrounding the target portion T. The liquid fuel is then sprayed through feed openings 24 in the conical spray plate 22.

An inert cooling liquid, as water, is supplied through a pipe 48 to the jacket space 31 surrounding the nozzle N and the main portion of the combustion chamber C. At the right-hand end of the jacket space 31, the inert cooling liquid is conducted by the pipe 40 to the volute 41, where it is sprayed into the target recess R through feed openings 24 in the conical spray plate 20.

If the addition of an inert cooling liquid to the combustion mixture is not desired, the pipe 40 may be closed by a valve 50 (Fig. 2) and the cooling liquid may be discharged from the jacket space 31 through a waste pipe 51 provided with any usual shut-off valve 51a.

With the construction above described, liquid fuel and liquid oxygen, with or without the addition of a third and inert liquid, are sprayed to the target recess R where they are thoroughly intermingled and ignited, and the burning mixture is then ejected to the combustion chamber C where combustion is continued, and from which the combustion gases are discharged through the nozzle N.

A combustion chamber thus constructed operates with high efficiency, and all parts of the apparatus are effectively cooled.

A modified construction is shown in Fig. 7 in which provision is made to prevent clogging of the oxygen spray plate 18 by freezing when the combustion chamber is not in operation. For this purpose, a supplementary jacket casing 60 is mounted outside of the jacket casing 30 previously described, thereby enclosing an outer jacket space 61 to which liquid nitrogen is supplied. Heat from the water in the jacket space 31 warms the liquid nitrogen.

The outer jacket space 61 is connected by a supply pipe 63 to a three-way valve 64 which may be operated by a solenoid 65. The valve 64 also has a supply pipe 66 for liquid oxygen and a feed pipe 68 connecting the valve 64 to the oxygen jacket space 69 and spray plate 70, these parts corresponding to the feed pipe 44, jacket space 34 and spray plate 18 shown in Figs. 1 and 2.

The three-way valve 64 and solenoid 65 may be of any commercial construction and the spray plate 70 may be similar to the spray plate 18 shown in Fig. 1 or the spray plate 22 shown in Fig. 4.

During operation of the combustion chamber C', the valve 64 is set by the solenoid 65 to connect the supply pipe 66 through the feed pipe 68 to the jacket space 69 and spray plate 70. When operation of the chamber C' is to be discontinued, the solenoid 65 is energized to shift the valve 64 to shut off the oxygen supply pipe 66 and to connect the nitrogen supply pipe 63 to the feed pipe 68. The warmed nitrogen gas, which is entirely dry, is then allowed to flow through the feed pipe 68, jacket space 69 and spray plate 70 until these parts are thoroughly warmed and until all condensed moisture is evaporated and removed. All danger of clogging of the feed openings in the spray plate 18 is thus effectively avoided.

Two forms of the invention having been fully described as to construction and operation, the invention is not to be limited to the details herein disclosed, otherwise than as set forth in the claims, but what is claimed is:

1. Combustion apparatus comprising a combustion chamber having a discharge nozzle at one end and having a closed axial extension providing a target recess at the other end, and a plurality of conical spray plates positioned at the end of said combustion chamber adjacent said recess and through which plates converging concentric conical sprays of two different combustion liquids are directed toward the closed outer end of said target recess.

2. Combustion apparatus comprising a combustion chamber having a discharge nozzle at one end and having a closed axial extension providing a target recess at the other end, said chamber having a series of conical wall portions connected by conical spray plates positioned at the end of said combustion chamber adjacent said recess and through which plates two different combustion liquids are injected in converging streams toward the closed outer end of said target recess, and means to feed said liquids to said spray plates.

3. Combustion apparatus comprising a combustion chamber having a discharge nozzle at one end and having an axial extension providing a target recess at the other end, means to inject combustion liquids in concentric conical sprays directed toward the closed end of said target recess, and said injecting means comprising a jacket surrounding a portion of the combustion chamber and having spray openings for injecting the combustion liquid in said jacket as a rearwardly directed conical spray to said target recess, and a second jacket surrounding said target extension and having spray openings for injecting a second combustion liquid in said second jacket as a coaxial and rearwardly directed conical spray to said target recess.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,102,345 | Lemale | July 7, 1914 |
| 1,879,186 | Goddard | Sept. 27, 1932 |
| 2,016,921 | Goddard | Oct. 8, 1935 |
| 2,350,086 | Young | May 30, 1944 |
| 2,397,834 | Bowman | Apr. 2, 1946 |

FOREIGN PATENTS

| Number | Country | Date |
|---|---|---|
| 729,926 | France | May 3, 1932 |
| 608,242 | Germany | Jan. 21, 1935 |
| 633,667 | Germany | Aug. 3, 1936 |

OTHER REFERENCES

"Astronautics" No. 33—March 1936, page 8, Fig. VIII.

"Aviation" January 1944, page 148.